Figure 1:
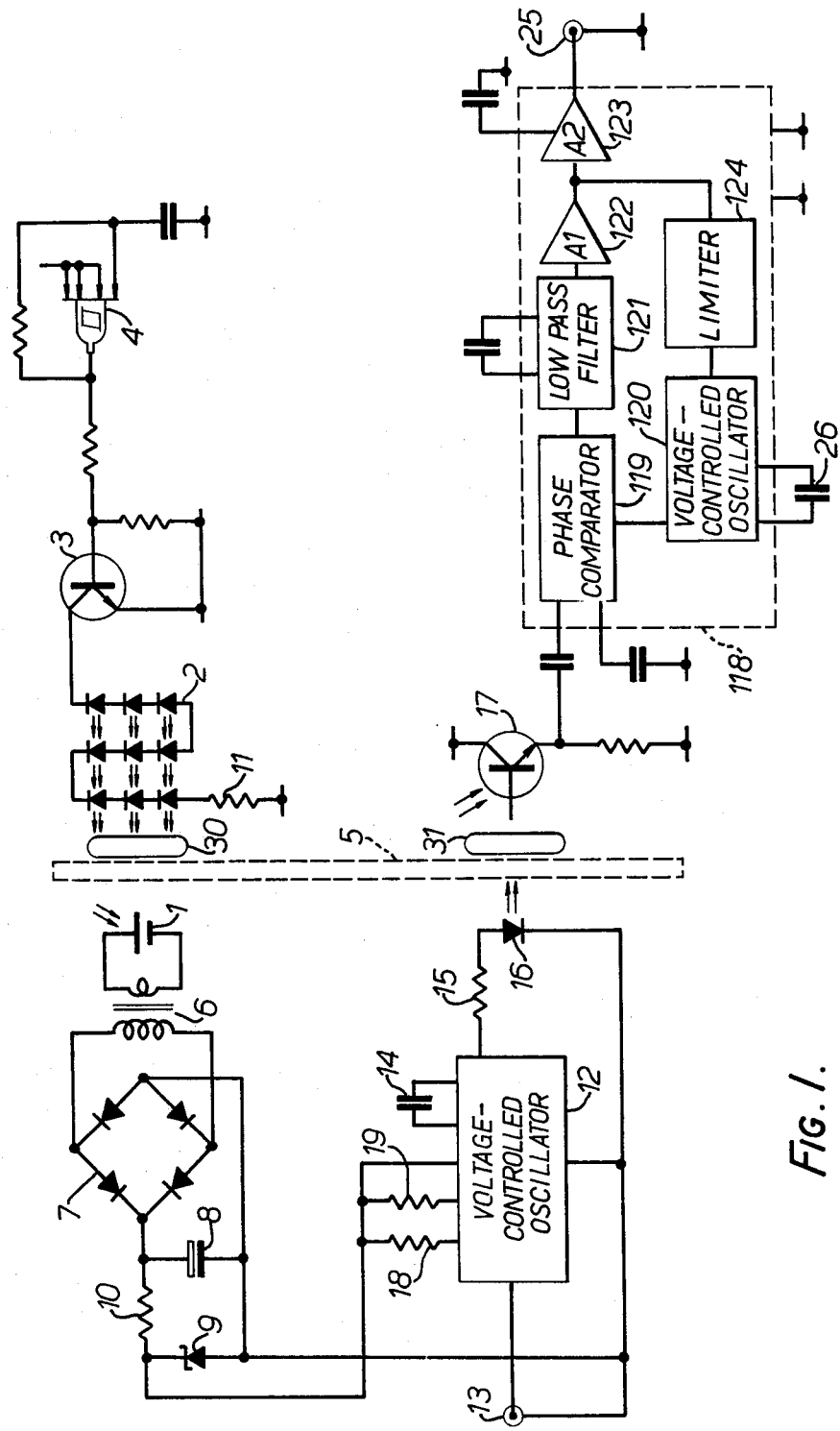

United States Patent [19]

Capewell

[11] 4,384,259
[45] May 17, 1983

[54] ELECTRICAL POWER SUPPLIES

[75] Inventor: Maurice J. Capewell, North Cheam, England

[73] Assignee: Data Beta Limited, Mitcham, England

[21] Appl. No.: 237,982

[22] Filed: Feb. 25, 1981

[30] Foreign Application Priority Data

Feb. 27, 1980 [GB] United Kingdom ............... 8006637
Dec. 23, 1980 [GB] United Kingdom ............... 8041163

[51] Int. Cl.³ .............................................. H03F 3/38
[52] U.S. Cl. ...................................... 330/10; 330/59; 330/297; 330/308; 323/902
[58] Field of Search ................................ 363/18-26; 323/221, 902, 906; 307/150, 151, 311; 324/118; 250/200, 551-553, 206; 330/10, 59, 297, 308

[56] References Cited

U.S. PATENT DOCUMENTS

| | | | |
|---|---|---|---|
| 3,401,357 | 9/1968 | D'Asaro | 330/59 X |
| 3,430,125 | 2/1969 | Povenmire et al. | 363/24 |
| 3,462,606 | 8/1969 | Case | 250/551 X |
| 3,944,854 | 3/1976 | Keller | 250/552 X |
| 4,117,411 | 9/1978 | Goble | 330/10 |
| 4,236,086 | 11/1980 | Hoebel | 250/551 X |

Primary Examiner—William M. Shoop
Assistant Examiner—Peter S. Wong
Attorney, Agent, or Firm—Mason, Fenwick & Lawrence

[57] ABSTRACT

A power supply suitable for energizing an isolation amplifier requiring its input section to be isolated electrically from its output section. The power supply consists of a primary circuit, which, when energized by an electrical supply, converts the electrical energy to infrared radiation, and a secondary circuit which includes a solar cell or cells arranged to receive the infrared radiation. Electrical energy is generated by the solar cell or cells when irradiated. The primary circuit of the power supply includes a plurality of infrared emitting diodes which are energized electrically to provide infrared radiation. The current produced by the solar cell or cells in response to the radiation is applied to a regulating circuit.

5 Claims, 2 Drawing Figures

ELECTRICAL POWER SUPPLIES

The invention relates to electrical power supplies, and especially to power supplies suitable for energising a part of electrical equipment which must be free to "float" electrically with respect to the rest of the equipment.

The input circuit of an electrical test or monitoring instrument may need to be so separated from the rest of the instrument that the input circuit does not impose its own potential on the subject being tested or monitored, and does not introduce into the instrument potential levels from the subject being tested or monitored that would damage or disable the instrument. An instrument for testing or monitoring generally includes an amplifier in its input circuit, and it is common practice to separate the amplifier into an input section and an output section with a.c. coupling between the sections in order to leave them free to assume differing potential levels, that is, to float with respect to each other. An amplifier so separated is often referred to as an isolation amplifier, and requires separated power supplies for the two sections in order to maintain the isolation between the sections.

It is known to use batteries for energising the input section of an isolation amplifier and to energise the output section of the amplifier from the equipment power supply. This arrangement has the drawback that the batteries need to be replaced periodically if they consist of primary cells, or recharged periodically if they consist of secondary cells. It is known also to energise the input section of the isolation amplifier from a transformer-coupled power supply where the transformer primary circuit is energised by the equipment main supply. This arrangement has the drawback that the transformer interwinding capacitances reduce the effective isolation from the main part of the equipment by introducing capacitive coupling in addition to transformer coupling.

The present invention provides a power supply having a primary circuit which, in operation, is energised by an electrical power source, and a secondary circuit which, in operation, acts as a source of electrical current isolated from the primary circuit, wherein, in order to effect energy transfer between the primary and secondary circuits, there is provided a solar cell located in the secondary circuit and a current-to-radiation converter located in the primary circuit and arranged to irradiate the solar cell.

Advantageously, the current-to-radiation converter consists of a plurality of photo-emissive diodes.

Advantageously, an optical pipe is used in the transmission path between the photo-emissive diodes and the solar cell.

Preferably, the photo-emissive diodes are connected to the output port of an oscillator.

Preferably, the oscillator is an astable multi-vibrator.

When the photo-emissive diodes are connected to the output port of an oscillator, the solar cell is advantageously connected to the primary winding of a transformer.

Preferably, the transformer has a step-up secondary winding, and, advantageously, the power supply includes a rectifying and regulating circuit connected to the transformer secondary winding.

The invention also provides an amplifying circuit including both a power supply in accordance with the invention and having a rectifying and regulating circuit as specified hereinbefore, and also an isolation amplifier, having an input section isolated electrically from its output section, the rectifying and regulating circuit of the power supply being connected to the supply input port of the input section of the amplifier.

Advantageously, the isolation amplifier has its input section coupled to its output section by means of a photoemissive diode and photo-transistor combination or, alternatively, a photo-emissive diode and photo-receiving diode combination.

Advantageously, a further optical pipe is used in the transmission path between the photo-emissive diode and the photo-transistor.

Preferably, the input section of the amplifier is a voltage-controlled oscillator and the output section is a phase locked loop, the two sections being coupled by means of a photo-emissive diode and photo-transistor or photo-receiving diode combination.

Alternatively, the input section of the amplifier is arranged to control the intensity of a photo-emissive diode and the output section is arranged to respond to a photo-receiving diode in the output circuit.

Alternatively, the isolation amplifier includes a UHF modulator/demodulator combination.

The amplifying circuit preferably includes a glass plate which is interposed between the input and output sections of the isolation amplifier and also between the primary and secondary circuits of the power supply.

A power supply, an input circuit employing the power supply and an isolation amplifier, all according to the invention, will now be described by way of example only with reference to the accompanying drawings which are circuit diagrams.

Figure 2:
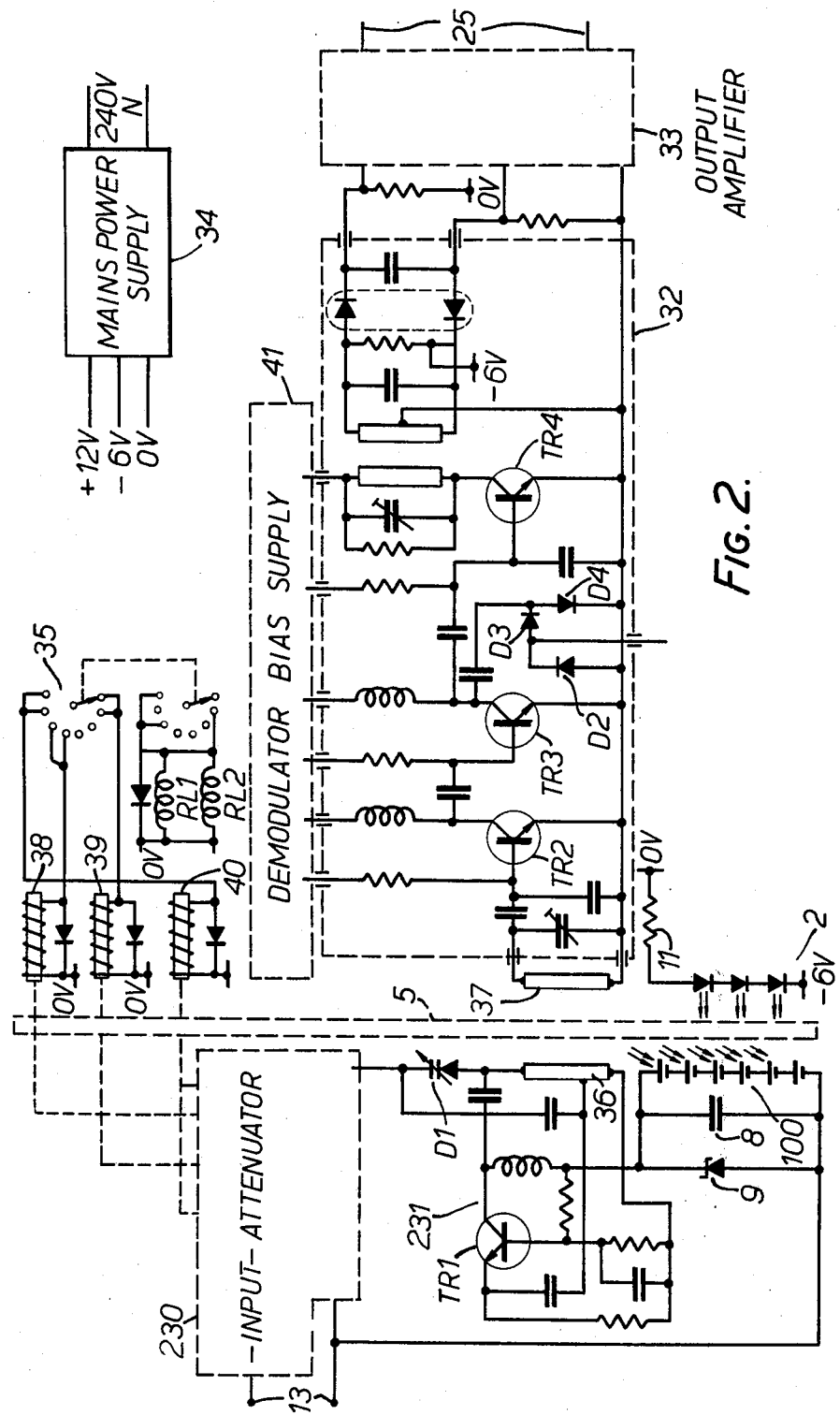

FIG. 1 represents an optically coupled isolation amplifier energised by one form of power supply according to the invention and, FIG. 2 represents a UHF isolation amplifier energised by another form of power supply according to the invention.

Referring to FIG. 1 of the accompanying drawings, the power supply comprises a primary circuit and a secondary circuit. The primary circuit includes a group of infrared-emitting diodes 2, a bipolar npn transistor 3, and an astable multivibrator 4. The secondary circuit of the power supply includes a solar cell 1, a pulse transformer 6, a rectifier bridge 7, and a smoothing and regulating circuit having a capacitor 8, a stabiliser diode 9 and a resistor 10. The primary and secondary circuits are separated from each other by a glass screen 5. The primary circuit of the power supply is energised by means of 5 V and 20 V. d.c. supplies which may be present in an instrument in which the power supply is located.

The multivibrator 4 is based on a type SN7413 NAND Schmitt trigger with an added resistor and capacitor connected in known manner. The group of diodes 2 consists of nine infrared emitting diodes connected in series in the collector circuit of the transistor 3 the base of which is connected to the output port of the multivibrator 4. When the multivibrator is operating the transistor is switched on and off at the multivibrator operating frequency. The group of diodes 2 become connected in series with a resistor 11 across the 20 V supply when the transistor 3 is conductive, so that the diodes are switched on and off by the multivibrator 4 through the transistor 3. The multivibrator frequency is 10 KHz.

The infrared radiation generated by the group of diodes 2 irradiates a solar cell 1 which behaves, in known manner, as a current source when so irradiated. Current pulses having a peak voltage level of 0.5 V are generated by the solar cell 1, and are stepped up to about 10 V peak to peak by means of a transformer 6 having a 20:1 turns ratio. The output pulses from the transformer 6 are rectified by means of the full-wave rectifier bridge 7, smoothed by the capacitor 8, and regulated to 5.1 V by means of the combination of the resistor 10 and the diode 9. The presence of the full-wave rectifier bridge 7 permits transformer reverse secondary current to flow.

The transformer 6 is required only to change the voltage level of the power supply. Isolation between the primary and secondary circuits of the power supply is provided by the effective isolation between the solar cell 1 and the radiation-emitting diodes 2. Capacitive coupling between the two parts of the circuit is minimal.

The output port of the power supply is connected, as shown in the drawing, to the power supply input port of a voltage controlled oscillator (VCO) 12, which has a signal input port 13. The voltage controlled oscillator 12 has an idling frequency which is set by means of a capacitor 14, and resistors 18 and 19. In this case the resistors are each 100 KΩ and the capacitor has a value of 220 pF giving an idling frequency of 300 KHz. An infrared emitting diode 16 and a current limiting resistor 15 are connected to the output port of the VCO. With the VCO arranged as described, an input signal which swings between +1V and −1V applied to the input port will result in a ±15% swing in the oscillator output frequency centred at its idling frequency. The output frequency deviation is directly proportional to the input signal amplitude with an accuracy of about 1%. The VCO is included in a type CD4046 integrated circuit which has other components not used in this application. The VCO and the infrared emitting diode 16 together form a frequency modulator in which the infrared emitting diode is switched on and off at a frequency which depends on the signal present at the input port 13 of the VCO.

The radiation from the diode 16 penetrates the 6 mm glass screen 5 to reach the base electrode of a photo-transistor 17 which converts the radiation pulses into electrical pulses. There is some loss in the transmission of the electrical energy, since the VCO12 produces electrical pulses having a 5 V amplitude while the photo-transistor 17 provides electrical pulses of 50 mV amplitude.

The frequency modulated electrical pulses from the phototransistor 17 are demodulated by means of a phase locked loop detector 118. The phase locked loop detector 118 responds to both frequency and phase changes of an input signal, and includes a phase comparator 119, a voltage controlled oscillator 120, a low pass filter 121, a limiter 124, and two amplifiers 122, 123. The VCO 120 is set to its idling frequency by means of an external capacitor 26 which has a value of 2200 pF in this case to give an idling frequency of about 300 KHz to match the idling frequency of the input VCO 12. It should be noted that mismatch in the idling frequencies of the two voltage controlled oscillators 12 and 120 will result only in a shift in the level of the output signal from the detector 118. The phase comparator 119 provides an input signal port to the phase locked loop detector 118 and compares both the phase and frequency of the signal received from the photo-transistor 17 with the signal from the oscillator 120. Any difference in these two parameters between the two signals results in an error signal being generated by the phase comparator 119. The error signal is fed back to the VCO 120 in such sense as to reduce the error signal after conditioning by means of the low pass filter 121, the amplifier 122, and the limiter 124. The error signal treated by the low pass filter 121 and the amplifier 123 is further amplified by the amplifier 123 to provide the demodulated signal of the detector 118 on an output port 25. The signal level at the output port 25 is about 4 V amplitude for an input signal frequency deviation of ±15%. The phase locked loop detector 118 is a type NE 561 integrated circuit available from Mullard Ltd. and other manufacturers.

The infrared emissive diode 16 and the photo-transistor 17 may be inseparable parts of a conventional opto-isolator having the diode and the transistor as a composite unit, in which case the glass screen 5 isolates the power supply alone, but where the diode 16 and photo-transistor are separate components, the glass screen 5 may, with advantage, act as a common insulating barrier for both the power supply and the isolation amplifier. When a common insulating barrier is present, it has on one side the secondary circuit of the power supply and the input voltage controlled radiation generator, and on the other side the primary circuit of the power supply and the detector of frequency modulated radiation.

Where the diode 16 and the photo-transistor 17 are separate components, an optical pipe or guide may be used in the transmission path between them as a means of increasing their electrical isolation from each other. An optical pipe or guide may also be used between the solar cell 1 and the group of radiation emissive diodes 2 in the power supply.

In FIG. 1 of the drawings an optical pipe 30 is shown located in the transmission path between the photo-emissive diodes 2 and the solar cell 1, and a further optical pipe 31 is shown located between the photo-emissive diode 16 and the photo-transistor 17.

The combined power supply and isolation amplifier provide an isolated input circuit for use as the input circuit of an electrical test or monitoring instrument.

The power supply may be used with other forms of linear isolation amplifier. As shown in FIG. 2, for example, the isolation amplifier may include a UHF modulator/demodulator combination instead of the optical modulator/demodulator.

As shown in FIG. 2, the isolated power supply includes a group of twelve light-emitting diodes 2 which are energised by direct current supplied by a mains power supply 34 by way of a resistor 11. Six solar cells 100 are illuminated by the light emitting diodes 2. The solar cells 100 and the light emitting diodes 2 are separated by a 6 mm. glass plate 5. A 1.8 V reference diode 9 stabilises the supply against both load and temperature variations. The isolated power supply provides at least 3 mA at 1.8 V without a transformer.

The isolation amplifier of FIG. 2 is conventional and will be described briefly.

A UHF modulator 231 is provided by a voltage controlled oscillator (VCO) which operates at 300 MHZ and which is frequency modulated by the capacitance of a varactor diode D1. The VCO employs a transistor TR1 in a Colpitts oscillator circuit. The UHF modulator 231 is energised by the isolated power supply.

An input attenuator 230 is required to bring the input signal within the operating range of the UHF f.m. modulator. The input attenuator 230 is arranged to have a high input impedance which remains constant. The attenuator 230 is controlled by means of reed contacts the contacts of which reside in the attenuator 236. The reed contacts are operated by electromagnets 38, 39, 40 which are isolated from the contacts by the glass plate 5. The electromagnets are included in an attenuator control circuit 35.

A demodulator 32 receives the signal from the VCO by way of a UHF transformer 3 having a primary section 36 and a secondary section 37 on opposite sides of the glass plate 5. The secondary section 37 of the transformer supplies the demodulator 32 in which transistor wideband amplifiers, arranged in cascade, are included. The amplifiers include transistors TR2 and TR2, respectively. The amplified signal from the second amplifier is clipped by means of diodes D2, D3, D4, of which diodes D3 and D4 are not carrier (Schottky) diodes. The diodes are followed by a detector stage which includes a transistor TR4.

All the stages of the demodulator 32 are energised by a demodulator bias supply 41 which includes a current stabiliser. In the demodulator bias supply 41 the collector current drawn by each of the transistors TR2, TR3, and TR4 is monitored and compared with a tracking reference derived from a zener diode.

An output amplifier 33 provides the output signal of the isolation amplifier. The output amplifier 33 includes relay contacts belonging to relays RL1 and RL2 which reside in the attenuator control circuit 35. The relays RL1 and RL2 control the gain of the output amplifier 33.

The mains power supply 34 is used also to energise the demodulator 32 by way of its bias supply 41, the output amplifier 33, and the attenuator control circuit 35. The mains power supply includes an input mains filter and a mains transformer.

It would be advantageous, as in the case of the optically isolated amplifier, to include an optical pipe in the transmission path between the photo-emissive diodes and the solar cells.

In the optically coupled isolation amplifier described with reference to FIG. 1, the photo-transistor 17 may be replaced by a photo-receiving diode. In the optically coupled isolation amplifier, the voltage controlled oscillator circuit and the phase locked loop detector circuit may be replaced by an intensity modulation system rather than a frequency modulation system.

What I claim is:

1. An amplifier arrangement including an isolated amplifier having an input section and an output section, an isolated power supply having a primary circuit and a secondary circuit, the secondary circuit of the power supply including a solar cell arranged, when irradiated, to supply direct current to the input section of the isolated amplifier, and the primary circuit of the power supply including a photo-emissive device arranged, when energized, to irradiate the solar cell, the input and output sections of the amplifier being physically separate from each other and the primary and secondary circuits of the power supply being physically separated from each other to permit an isolating member to be interposed between the input and output sections of the amplifier and between the primary and secondary circuits of the power supply.

2. An amplifying circuit as claimed in claim 1, wherein the input section of the amplifier is coupled to its output section by means of a photo-emissive diode and photo-transistor combination.

3. An amplifying circuit as claimed in claim 2, which includes an optical pipe located in the transmission path between the input and output sections of the amplifier.

4. An amplifying circuit as claimed in claim 3, wherein the input section of the amplifier is a voltage-controlled oscillator and the output section is a phase locked loop phase-frequency detector.

5. An amplifying circuit as claimed in claim 1, wherein the input section of the amplifier includes a UHF frequency modulated oscillator and the output section of the amplifier includes a UHF frequency modulation demodulator.

* * * * *